United States Patent [19]

Gustafson

[11] Patent Number: 5,129,786
[45] Date of Patent: Jul. 14, 1992

[54] VARIABLE PITCH PAN BLADE RETENTION ARRANGEMENT

[75] Inventor: Robert E. Gustafson, Windsor, Conn.

[73] Assignee: United Technologies Corporation, Hartford, Conn.

[21] Appl. No.: 610,666

[22] Filed: Nov. 8, 1990

[51] Int. Cl.⁵ .................... F04D 29/36; F01D 5/30
[52] U.S. Cl. .......................... 416/209; 416/220 R; 416/205
[58] Field of Search ........... 416/204 A, 204 R, 219 R, 416/220 R, 217, 248, 205, 209, 239

[56] References Cited

U.S. PATENT DOCUMENTS

| | | | |
|---|---|---|---|
| 1,347,031 | 7/1920 | Guy | 416/220 R |
| 1,415,266 | 5/1922 | Rice | 416/217 |
| 2,430,185 | 10/1947 | Prescott | 416/220 R |
| 2,658,718 | 10/1953 | Walker | 416/220 |
| 2,974,924 | 3/1961 | Rankin et al. | 416/220 |
| 3,746,468 | 7/1973 | Saunders | 416/220 |
| 4,012,171 | 3/1977 | Suvak | 416/209 |
| 4,630,999 | 12/1986 | De La Harpe | 416/205 |
| 5,015,150 | 5/1991 | Rohra | 416/209 |

FOREIGN PATENT DOCUMENTS 1159964 12/1963 Fed. Rep. of Germany ...... 416/200

Primary Examiner—Edward K. Look
Assistant Examiner—Michael S. Lee
Attorney, Agent, or Firm—William W. Habelt

[57] ABSTRACT

To ensure retentioin of the blade tongue 16 of a propfan blade 10 within a receiving slot 24 in the disc arm 20 of the fan hub 4 even under the high centrifugal forces exerted on the blade 10 while rotating at high rpm, at least one pair of retaining pins 30 and 40 are provided. First seating grooves 32 and 42, respectively, are provided on opposite faces 15 and 17 of the blade tongue 16 and holes 34 and 44 are drilled transversely through the disc arm 20 so as to form corresponding second seating grooves 36 and 46, respectively, on opposite side walls 26 and 28 of the slot 24. The first and second seating grooves are arranged opposite of and parallel to each other such that each pair of grooves 32 and 36 form a retention channel between the first face 15 of the tongue 16 and the opposed side wall 26 of the slot 24 and aligned with the holes 34 and 44 for receiving the retaining pins 30 and 40 thereby locking the blade tongue within the slot 24.

2 Claims, 2 Drawing Sheets

VARIABLE PITCH PAN BLADE RETENTION ARRANGEMENT

TECHNICAL FIELD

This invention relates to the retention of rotor blades in a rotary propulsion device and, more particularly, to the retention of variable pitch fan blades on a prop-fan or ducted fan type aircraft engine in such a manner as to permit quick removal and replacement of the fan blades.

BACKGROUND ART

One type of engine currently used on commercial aircraft comprises a turbine engine assisted by a freestream fan or a ducted fan. The prop-fan engine consists of a turbine engine and a freestream propulsive fan mounted to either the forward or aft end of the turbine shaft. The turbofan engine consists of a turbine engine and a ducted propulsive fan mounted to either the forward or aft end of the turbine shaft. In either type of engine, the turbine of the engine absorbs energy from the expanding exhaust gases produced in the engine combustor to provide power to not only turn the engine compressor and its associated equipment, but also to deliver the torque for driving the propulsive fan. Thus, the propulsive forces for the aircraft are produced from the combined thrust of the turbine exhaust gases and the propulsive fan.

In order to convert the torque delivered to the engine shaft to which the prop-fan or ducted fan is mounted into thrust as efficiently as possible over a wide range of operating rpm, it is necessary to vary the pitch of the fan blades to minimize blade drag. A typical prop-fan or ducted fan includes a multiplicity of fan blades, usually from 6 to 12 for a prop-fan and up to 24 or more for a ducted fan, each of which is mounted to a radially extending arm of a fan hub which is mounted to the engine shaft for rotation therewith. In order to permit changes in blade pitch, each of the support arms is independently connected to the fan hub and is structurally independent from its counterparts. Each fan blade is retained within its support arm by means of a retention member, most commonly, a retention ring which is positioned about the shank of the fan blade in a bearing race on the disc arm. While this type of retention means has proven functionally most adequate, the fan blades are not readily removable. Thus, replacing fan blades is a labor intensive and time consuming task.

Accordingly, it is an object of the present invention to provide a retention arrangement for securing a blade to a support arm which permits ready and rapid removal and replacement of the blade.

DISCLOSURE OF INVENTION

In accordance with the present invention, an arrangement is provided for mounting a variable pitch fan blade to a rotating fan hub so as to ensure retention of the blade within the disc arm even under the high centrifugal forces exerted on the blade while rotating at high rpm.

Accordingly, the shank extending from the blade is provided with a mounting flange at the end thereof which has first and second faces on opposite sides thereof. The disc arm has a head having a cylindrical disc-like outboard end having a slot formed therein for receiving the mounting flange of the blade. The disc arm shaft extends radially inwardly from the inboard end of the head and is adapted at its other end to connect to the fan hub. The receiving slot has a first side wall facing in opposed relationship to the first face of the received mounting flange and a second side wall facing in opposed relationship to the second face of the received mounting flange. At least one pair of retaining pins are provided to restrain radially outward movement of the blade and lock the blade flange within the disc arm slot. To accommodate retaining pins, first seating grooves are provided on opposite faces of the blade tongue and holes are drilled transversely through the disc arm so as to form corresponding second seating grooves on the opposite side walls of the receiving slot. The first and second seating grooves are arranged opposite of and parallel to each other such that each pair of grooves form a retention channel between the face of the blade flange tongue and the opposed side wall of the slot.

BRIEF DESCRIPTION OF DRAWING

These and other objects, features and advantages of the present invention will become more apparent in light of the detailed description of a best mode embodiment thereof, as illustrated in the accompanying drawing, wherein.

BEST MODE FOR CARRYING OUT THE INVENTION

Figure 1:
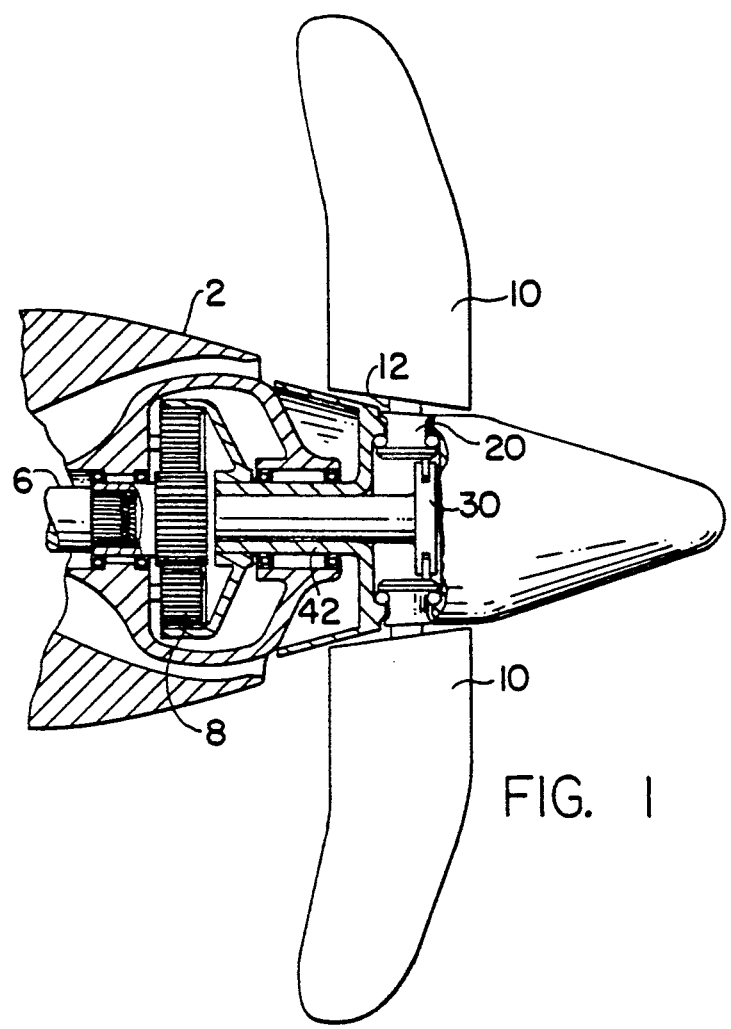
FIG. 1 is a side elevation view, partly in section, of a prop-fan engine.
Figure 2:
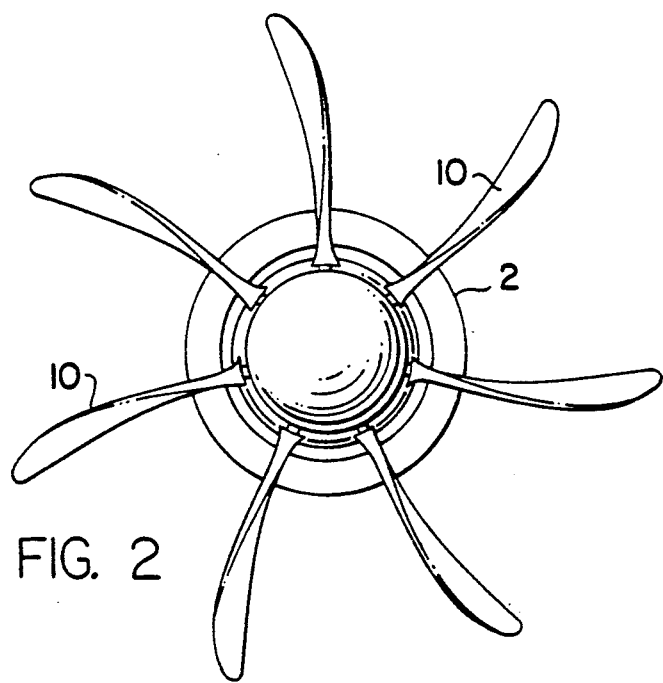
FIG. 2 is a front elevation view of the prop-fan engine of FIG. 1.

Referring now to FIGS. 1 and 2, there is depicted therein a multi-bladed prop-fan engine 2 of the type to which the present invention has particular application Although, the present invention is being described with respect to a prop-fan application solely for purposes of illustration, but not limitation, it is to be understood that the present invention may as well be applied to other fans incorporating variable pitch blades, such as ducted fans on turbofan aircraft engines.

The prop-fan comprises a multiplicity of fan blades 10, each blade 10 being mounted to a retaining member 20, commonly referred to as a disc arm, in a manner to be further discussed hereinafter. Each disc arm 20 extends radially from the engine hub 4 which is mounted through suitable gearing 8 to a drive shaft 6, driven by the engine turbine (not shown), for rotation therewith. Typically from 6 to 12 blades would be mounted to the hub in the manner shown at equally spaced intervals about the circumference of the hub to form the prop-fan. A suitable pitch change mechanism 30 of conventional type is provided in operative association with each of the disc arms 20 to rotate the disc arms 20 as appropriate to adjust the pitch of the blades 10 in a manner well known in the art.

Figure 3:
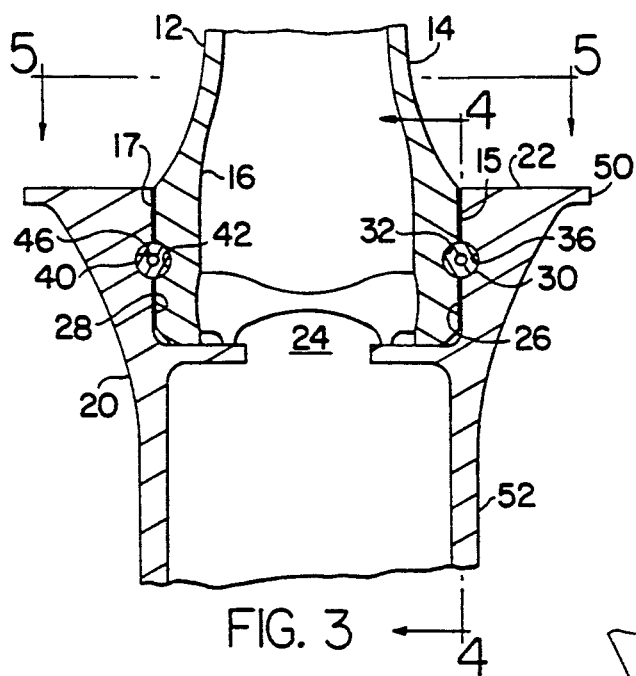
FIG. 3 is a sectional side elevation view of a prop-fan blade mounted to a disc arm in accordance with the present invention.
Figure 4:
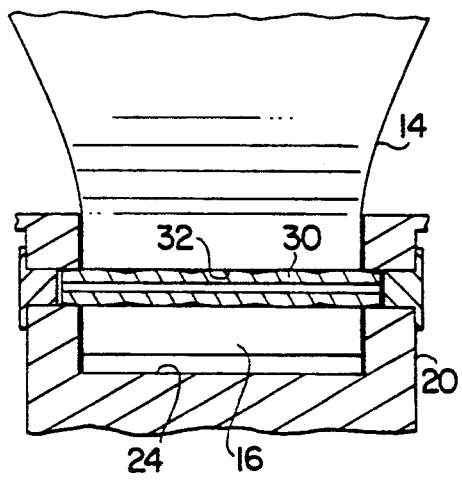
FIG. 4 is a sectional side elevation view taken along line 4—4 of FIG. 3.
Figure 5:
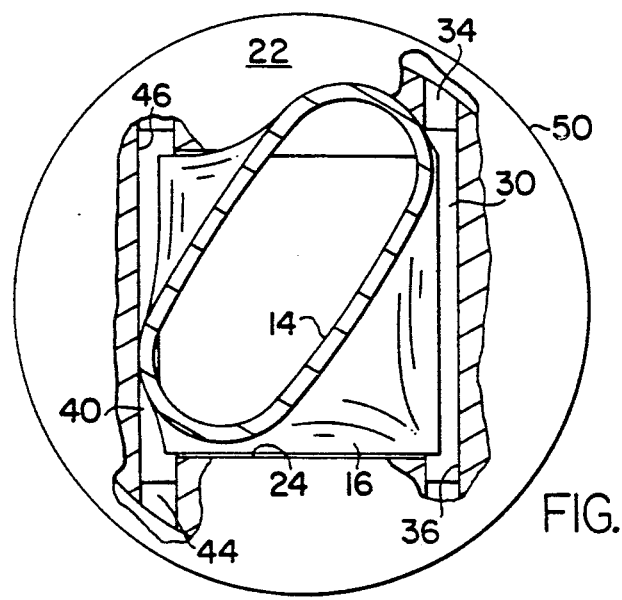
FIG. 5 is a plan view, partly in section, taken along line 5—5 of FIG. 3.

Referring now to FIGS. 3, 4 and 5 of the drawing, there is depicted therein an arrangement for mounting each variable pitch prop-fan blade 10 of the prop-fan engine 2 to its respective disc arm 20 in accordance with the present invention. Each prop-fan blade 10 has a shank 12 having a mounting flange 14 at the end thereof which facilitates retention of the blade 10 in the disc arm 20 in accordance with the present invention. The retention flange 14 comprises a stub-like tongue 16 having a generally rectangular cross-section and adapted to be received in an encompassed mating slot 24 machined in the top surface 22 of the disc-like head 50 of the disc arm 20. The slot 24 has a cross-section of a shape corresponding to that of the tongue 16, i.e generally rectangular, but sized slightly larger than the tongue 16 so as to loosely receive in mating relationship the tongue 16 of the flange 14 of the blade 10. The slot 24 is provided with a depth sufficient to receive a substantial portion of the blade tongue 16 therein so as to ensure proper retention of the blade tongue 16 therein and is completely encompassed by the continuous ring structure provided by the disc-like head 50.

To ensure retention of the blade tongue 16 within the slot 24 in the disc arm 20 even under the high centrifugal forces exerted on the blade 10 while rotating at high rpm, at least one pair of retaining pins 30 and 40 are provided as shown in FIGS. 3, 4 and 5 to restrain radially outward movement of the blade 10. To accommodate the pins 30 and 40, first seating grooves 32 and 42, respectively, are provided on opposite faces 15 and 17 of the blade tongue 16 and holes 34 and 44 are drilled transversely through the disc arm 20 so as to form corresponding second seating grooves 36 and 46, respectively, on opposite side walls 26 and 28 of the slot 24. The first and second seating grooves are arranged opposite of and parallel to each other such that each pair of grooves 32 and 36 form a retention channel between the first face 15 of the tongue 16 and the opposed side wall 26 of the slot 24 which is aligned with a hole pin insertion hole 34 drilled through the disc arm 20 and each pair of grooves 42 and 46 form a retention channel between the second face of the tongue 16 and the opposed side wall 28 of slot 24 which is aligned with a pin insertion hole 44 drilled through the disc arm 20.

To mount the blade 10 to its disc arm 20, the tongue 16 at the end of the mounting flange 14 is inserted in the slot 24 in the outboard surface 22 of the disc arm 20 until the first seating grooves 32 and 42 in the faces 15 and 17, respectively, of the blade tongue 16 ar aligned opposite their respective corresponding second seating grooves 36 and 46, respectively, in the side walls 26 and 28 of the slot 24. Once the blade tongue 16 has been so inserted and aligned within the slot 24, the retaining pins 30 and 40 are inserted, respectively, in the pin insertion holes 34 and 44 in the disc arm 20 so as to be received within and pass through the retention channels formed by the paired sets 32,36 and 42,46, respectively, of the first and second seating grooves. To remove the blade 10 from its disc arm 20 for repair or replacement, the pins 30 and 40 are simply driven out of their respective holes 34 and 44, and the blade 10 lifted so as the slide the blade tongue 16 out of the slot 24.

With the retaining pins 30 and 40 extending through their respective seating grooves and into the holes 34 and 44, the blade 10 is securely held within the slot 24 in the disc arm 20 by means of the pins 30 and 40 extending through the paired sets 32,36 and 42,46, respectively, of the first and second seating grooves, and cannot be flung out of the slot 24 under the centrifugal forces acting upon the blade 10 as its rotates. The 180 degree encapsulation of the retaining pins 30,40 by both the blade tongue 16 and the side walls of the slot 24 also prevents the unloading or rocking of the blade 10 within the disc arm 20 from high impact moment loadings not infrequently experienced during operation.

Any loads acting on the blade 10 are passed through the retaining pins 30 and 40 into the disc arm 20 and are thence carried in hoop tension in the continuous ring structure provided about the blade tongue 16 by the head 50 of the disc arm 20. The disc arm head 50 is advantageously comprised of a cylindrical disc-like outboard end whose outer surface defines the top or outboard surface 22 of the disc arm 20 and a substantially conical transition portion extending from the cylindrical disc-like outboard end to the shaft 52 of the disc arm 20. The shaft 52 is adapted at its inboard end to be connected to the prop-fan hub 4 in a manner well known in the art.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. An arrangement for mounting a variable pitch fan blade to a rotating fan hub, said blade having a shank extending therefrom having a mounting flange at the end thereof, the mounting flange having first and second faces on opposite side thereof; said arrangement comprising:
   a. a disc arm having a head and a shaft extending radially inwardly therefrom and adapted at its inward end to connect to the fan hub, the head having an encompassed slot formed therein for receiving the mounting flange of the blade, the receiving slot having a first side wall facing in opposed relationship to the first face of the received mounting flange and a second side wall facing in opposed relationship to the second face of the received mounting flange, the head forming a continuous load-carrying structure completely encompassing the receiving slot and the blade mounting flange received therein;
   b. first seating grooves formed in the first and second faces of the mounting flange of the blade;
   c. second seating grooves formed in the first and second side walls of the receiving slot, said second seating grooves being disposed opposite of and parallel to said first seating grooves when the mounting flange is positioned in the receiving slot whereby each opposed set of said first and second seating grooves forms a retention channel;
   e. retaining pin means disposed within each retention channel for locking the mounting flange into the receiving slot; and
   f. access means provided in said disc arm opening to each retention channel for insertion of said retaining pins into the retention channel and removal therefrom.

2. An arrangement as recited in claim 1 wherein the head of said disc arm has a substantially cylindrical disc-like outboard end and a transition portion extending therefrom to the shaft of said disc arm which fully encompasses the receiving slot so as to provide a continuous load-carrying structure about the receiving slot and the blade mounting flange received therein.

* * * * *